(No Model.)
H. E. KEYES.
STUD DRIVER AND NIPPLE HOLDER.
No. 540,989. Patented June 11, 1895.
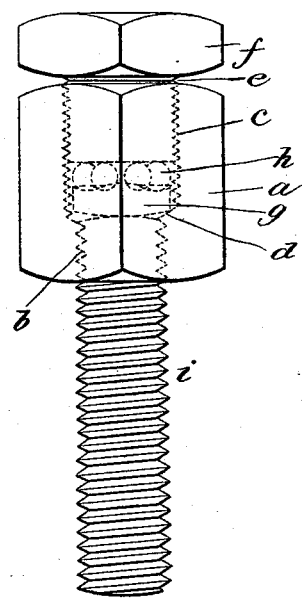
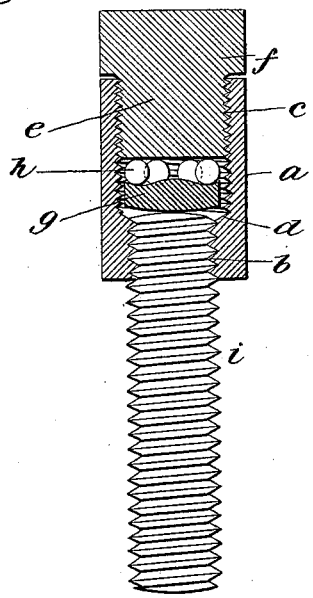
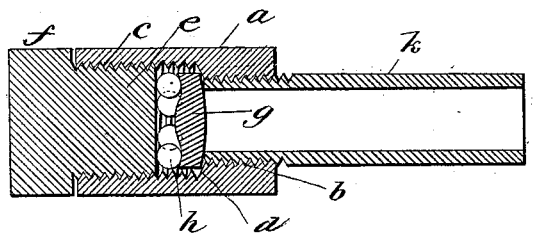
Witnesses
J. F. Coleman
E. A. Finckel
Inventor
Harry E. Keyes,
by Wm. H. Finckel,
Atty.

UNITED STATES PATENT OFFICE.

HARRY E. KEYES, OF HOMESTEAD, PENNSYLVANIA, ASSIGNOR TO THE HOMESTEAD MANUFACTURING COMPANY, LIMITED, OF SAME PLACE.

STUD-DRIVER AND NIPPLE-HOLDER.

SPECIFICATION forming part of Letters Patent No. 540,989, dated June 11, 1895.

Application filed October 2, 1894. Serial No. 524,759. (No model.)

*To all whom it may concern:*

Be it known that I, HARRY E. KEYES, a citizen of the United States, residing at Homestead, in the county of Allegheny and State of Pennsylvania, have invented a certain new and useful Improvement in Stud-Drivers and Nipple-Holders, of which the following is a full, clear, and exact description.

In driving or setting stud bolts in bed plates and other objects by means of a stud driver, so-called, the set-screw or other device used to adjust the driver to the stud bolt becomes so hard set by the operation of driving the stud that the efforts to remove the driver from the stud, after the stud has been driven or set, almost invariably result in running out the stud more or less, or injuring its threads. A somewhat similar difficulty is encountered in nipple holders.

It is the object of this invention to provide a stud driver or nipple holder which may be readily released from the stud or nipple after the stud has been driven or the nipple has been threaded, without liability of running out or backing out the object acted upon, or defacing its thread.

The invention consists of a stud driver or nipple holder in which an anti-friction device is interposed between the object to be acted upon and the set screw by which the object is retained in the device, whereby, no matter what amount of force has been used in acting upon the object, the set screw may be readily removed or released in order to effect the disengagement of the driver or holder from the stud or nipple, all as I will proceed now more particularly to set forth and finally claim.

In the accompanying drawings, illustrating my invention, in the several figures of which like parts are similarly designated, Figure 1 is a side elevation showing my invention as applied to a stud-bolt, and Fig. 2 is a longitudinal section of the same. Fig. 3 shows the device employed as a nipple-holder, with a nipple or piece of pipe in position therein.

The construction of the stud driver and the nipple holder is the same, excepting in so far as the receiving thread for the object to be acted upon is of a pitch and number appropriate to such object.

The body $a$ of the device may be an angular piece of hard or hardened metal, such as case hardened steel, adapted to be acted upon by a wrench or other turning device. In one end of this body $a$ a screwthreaded hole, $b$, is made, the size of the hole and the pitch and number of the threads being proportionate to the object to be acted upon. A preferably larger, internally-screwthreaded cavity $c$ is made in the other end of the body $a$, in alignment with the screwthreaded hole $b$, and the bottom of this larger hole $c$ may have a squared or beveled bottom or shoulder $d$. The screwthreaded hole $c$ is adapted to receive a screwthreaded plug or set screw $e$, having a head $f$, preferably of the same contour as the contour of the body $a$, so that the same tool that is used for operating the body may also be used, without adjustment, for operating the set screw.

Between the inner end of the screwthreaded portion of the set screw $e$ and the shoulder $d$ is arranged a washer or follower $g$, and one face of this washer may be made convex, as shown clearly in Fig. 2, and its opposite face may be grooved or made concave, as also shown in the same figure; and between the grooved or concaved face of the washer or follower $g$ and the inner end of the set screw $e$ I arrange the hard metal spheres or balls $h$, upon which the set screw bears in order to force the washer or follower against the inner end of the stud $i$, which is shown in position in Figs. 1 and 2, to set said stud in the driver. Obviously, these spheres or balls $h$ act as anti-friction devices, and hence no matter how much force may be applied in driving or setting the stud, the set screw may be readily released in order to enable the driver to be backed off from the stud, without danger of backing or running out the stud, and without liability of marring its threads.

As already intimated, this device may be used as a nipple holder for holding short sections of pipe, or nipples, as they are technically termed, while one end of said pipe or nipple is being threaded; and such a use of the device is illustrated in Fig. 3. In this view, Fig. 3, similar letters of reference are used to indicate parts corresponding to parts in Figs. 1 and 2. The pipe or nipple $k$ has been threaded at one end, and such threaded end has been turned into the body *a* and set therein against further rotation by jamming the washer or follower *g* down against its end. The body *a* may then be held in any suitable vise or wrench, and then the thread-cutting device applied to the outer end of the nipple in the usual way.

Of course, I do not mean to claim broadly the use of spheres or balls as an anti-friction device, nor do I claim broadly a nipple holder in which a follower is interposed between the end of the pipe and the set screw.

What I claim is—

1. The body *a* adapted to receive a screw-threaded object in one end, and having a set-screw in its other end, and an anti-friction device arranged within said body and interposed between the inner ends of the object to be acted upon and the set-screw, to enable the set-screw to be released to permit the backing off of the body from the object being acted upon, substantially as described.

2. The body *a* provided with a threaded opening at one end, a set-screw in the other end, a follower or washer arranged within the body next to its open end, and hard metal balls or spheres interposed between the said follower or washer and the inner end of the set-screw, substantially as and for the purpose described.

In testimony whereof I have hereunto set my hand this 29th day of September, A. D. 1894.

HARRY E. KEYES.

Witnesses:
W. HESTON,
W. C. MILLER.